United States Patent [19]

Hiramatsu

[11] Patent Number: 5,548,284
[45] Date of Patent: Aug. 20, 1996

[54] INFORMATION RECORDING AND/OR REPRODUCTION APPARATUS

[75] Inventor: Makoto Hiramatsu, Kawasaki, Japan

[73] Assignee: Canon Kabushiki Kaisha, Tokyo, Japan

[21] Appl. No.: 165,847

[22] Filed: Dec. 14, 1993

[30] Foreign Application Priority Data

Dec. 16, 1992  [JP]  Japan ................................. 4-353876

[51] Int. Cl.⁶ ..................................................... H03M 5/00
[52] U.S. Cl. ............................................................. 341/68
[58] Field of Search ................................. 360/59, 46, 67, 360/51; 341/68, 58, 55; 375/99, 104

[56] References Cited

U.S. PATENT DOCUMENTS 4,408,189  10/1983  Betts et al. .
4,823,208   4/1989  Ouchi et al. .............................. 360/46
5,359,585  10/1994  Tanoue et al. .

FOREIGN PATENT DOCUMENTS 2011970  9/1990  Canada .
0143553  6/1985  European Pat. Off. .
0319216  6/1989  European Pat. Off. .
4007987  9/1990  Germany .

OTHER PUBLICATIONS

IEEE Translation Journal on Magnetics in Japan, vol. 6, No. 8, Aug. 1991, pp. 698–708, H. Osawa et al., 'Performance of Partial Response System for (2,7) RLL Code'.
IEEE Transactions on Communications, vol. 35, No. 2, Feb. 1987, pp. 142–150, Dae Young Kim et al. 'Run Length Limited Variants of Doubinary and Modified Duobinary'.
Patent Abstracts of Japan, vol. 8, No. 211, (p–303)(1648) Sep. 26, 1984 Moriji Izumida, Digital Signal Recorder.
Jpn. J. Appl. Phys., vol. 31, No. 2B, Feb. 1992, pp. 670–679, C. M. J. Van Uijen et al. 'Performance Of Modulation Codes In Various Optical Recording Media'.

Primary Examiner—Brian K. Young
Attorney, Agent, or Firm—Fitzpatrick, Cella, Harper & Scinto

[57] ABSTRACT

In an information recording/reproducing apparatus, a data train of 1 and 0 as recording information is precoded to be converted into a recording data train. The recording data is recorded on a recording medium. A reproduction signal from the recording medium on which the recording data is recorded is obtained by partial response waveform equalization. The recording information has at least one data change from 0 to 1 or 1 to 0 within a predetermined period.

19 Claims, 7 Drawing Sheets

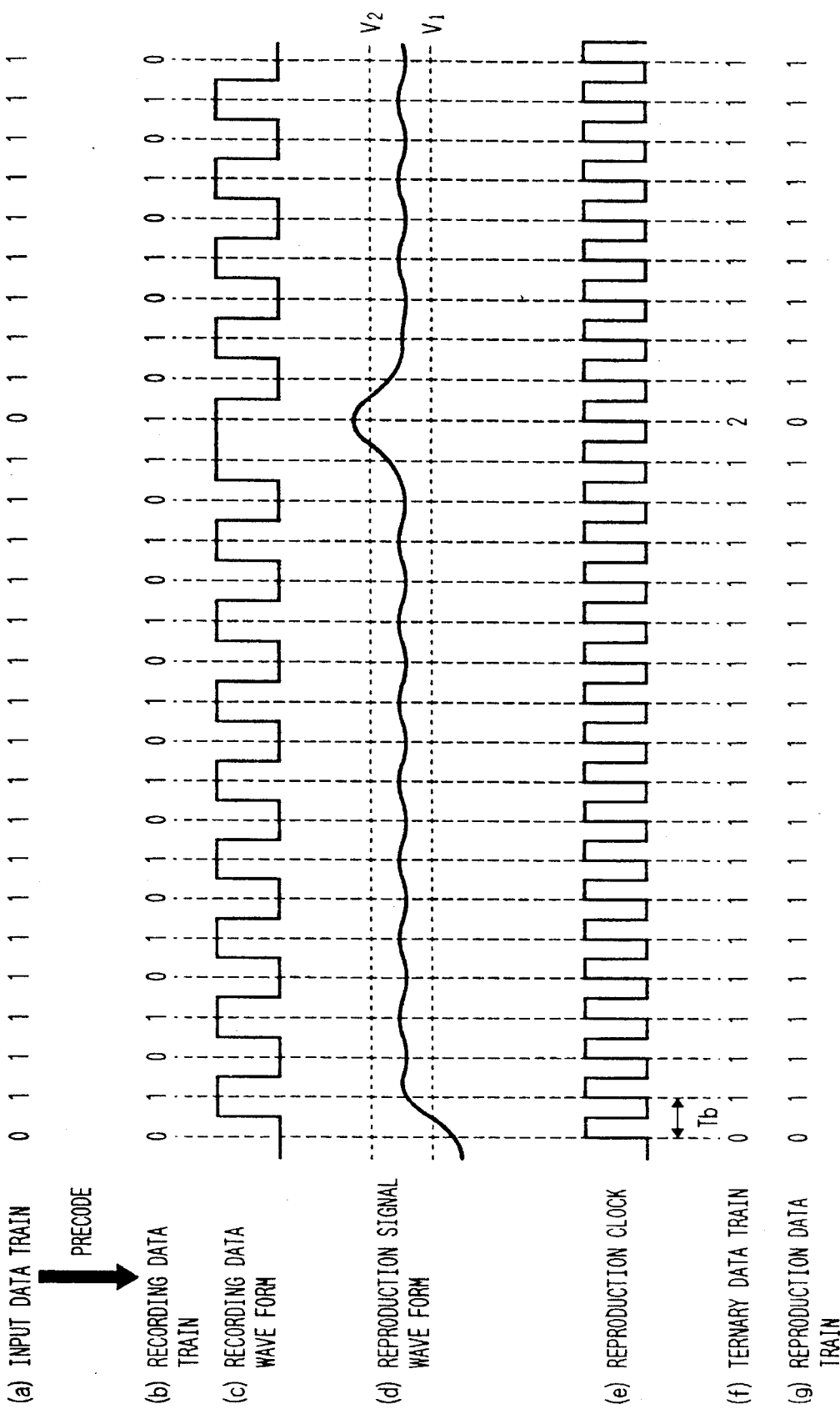

INFORMATION RECORDING AND/OR REPRODUCTION APPARATUS

BACKGROUND OF THE INVENTION

1. Field of the Invention

The present invention relates to an information recording/reproduction apparatus for reproducing information as an (N+1)-value reproduction data train, and extracting a reproduction clock from the reproduction data train and, more particularly, to an information recording/reproduction apparatus for generating a reproduction signal by equalizing a partial response waveform.

2. Related Background Art

Conventionally, when information is recorded in an information recording/reproduction apparatus, input information is code-converted into a recording data train by a predetermined modulation method, and the recording data train is recorded as a recording signal on a recording medium. When recorded information is reproduced, a reproduction signal is compared with one slice level $V_0$ to discriminate data "1" or "0". The reproduction process will be described below with reference to FIG. 1. In the following description, for the sake of simplicity, an original data train to be recorded is called input information, a data train which is converted according to a predetermined code-conversion rule, and is to be input to a precoder or an NRZI converter, is called an input data train, NRZI-converted data to be actually recorded on a recording medium is called a recording data train, a signal which is reproduced from the recording medium, and is subjected to waveform equalization is called a reproduction signal, and data obtained by binarizing the reproduction signal and detected as binary data by a reproduction clock is called reproduction data.

(a) of FIG. 1 shows a recording data train. A recording data waveform shown in (b) of FIG. 1 is generated according to the recording data train, and is recorded as a recording signal on a recording medium. When the recorded information is reproduced, a reproduction signal waveform shown in (c) of FIG. 1 is obtained. When the reproduction signal waveform is binarized by comparing it with the slice level $V_0$, a reproduction data waveform shown in (d) of FIG. 1 is generated. (e) of FIG. 1 shows a reproduction clock, and a reproduction data train shown in (f) of FIG. 1 is detected using the reproduction clock. The reproduction clock is extracted under the PLL control using the reproduction data. Therefore, unless data bits "0" continuously appear in the recording data train, an edge is generated in the reproduction data, and the clock can be extracted from the reproduction data itself.

Recently, a high density and high transfer rate are required for an information recording/reproduction apparatus. However, when a high density and high transfer rate are realized in the information recording/reproduction apparatus, inter-code interference cannot be ignored due to narrowing of the detection window width, and the apparatus becomes complicated if the interference is to be removed, resulting in an increase in cost. As a means for solving this problem, recently, a means adopting partial response has been proposed. Partial response is a technique for reproducing information without removing inter-code interference by defining inter-code interference caused by transfer characteristics of a recording/reproduction system of the information recording/reproduction apparatus to be a convolution of information.

A reproduction system of an information recording/reproduction apparatus which adopts class 1 partial response (PR(1, 1)) will be described below with reference to the accompanying drawings. FIG. 2 shows signal waveforms of the reproduction system for an isolated bit. (a) of FIG. 2 shows a recording data train, and (b) of FIG. 2 shows a recording data waveform which is recorded on a recording medium. The recorded information is reproduced, and waveform equalization is performed, so that a reproduction signal has a reproduction signal waveform shown in (c) of FIG. 2. The bit interval of transfer data is $T_b$, and a reproduction signal for two bits becomes 1 with respect to 1-bit data "1" when viewed from the reproduction signal. More specifically, data "1" has 1 as an inter-code interference in the next bit.

FIG. 3 shows reproduction signal waveforms obtained when arbitrary data is recorded upon execution of such waveform equalization. (a) of FIG. 3 shows input data. When the input data is precoded to prevent error transmission, a recording data train shown in (b) of FIG. 3 is obtained. (c) of FIG. 3 shows a recording data waveform of this recording data train, which waveform corresponds to a signal recorded on a recording medium. When the recorded signal is reproduced, and is subjected to the above-mentioned waveform equalization, a reproduction signal shown in (d) of FIG. 3 is obtained. This reproduction signal is ternary-detected by level-slicing this signal by two slice levels $V_1$ and $V_2$ shown in (d) of FIG. 3, thereby generating a ternary data train, as shown in (f) of FIG. 3. As a result of ternary detection, when data "1" is determined in correspondence with level 1, and data "0" is determined in correspondence with level 0 or 2, a reproduction data train can be generated, as shown in (g) of FIG. 3. Note that (e) of FIG. 3 shows a reproduction clock.

In the case of coding without partial response, PLL control is executed using a reproduction data signal obtained by comparing the reproduction signal with the slice level $V_0$, as described above, thereby generating reproduction data synchronous with a reproduction clock. Therefore, the time interval required for the reproduction signal to cross the slice level, i.e., a change point of recording data from "1" to "0" or vice versa, e.g., as for NRZI codes, how many "0"s are present between two "1"s before NRZI conversion, determines the performance of codes in terms of controllability of PLL.

However, when the above-mentioned partial response is used, if "1"s continuously appear in input data (that is, a long string consisting entirely of "1"s with no intervening "0"s), then the level of the reproduction signal is kept at level 1, the reproduction signal crosses neither the slice level $V_1$ nor $V_2$. This state will be described below with reference to FIG. 4. (a) of FIG. 4 shows input data. When such data including continuous "1"s is to be recorded, a precoded recording data waveform shown in (c) of FIG. 4 is obtained. When this data is recorded, is reproduced, and is then subjected to waveform equalization, a reproduction signal waveform as shown in (d) of FIG. 4. As can be seen from (d) of FIG. 4, the reproduction signal waveform crosses neither the slice level $V_1$ nor $V_2$ as long as "1"s continuously appear in the data. For this reason, in a self-clock system for extracting a reproduction clock from an edge of data, a reproduction clock cannot be extracted.

This problem will be discussed in more detail below. In this case, DC-free 8–9 NRZI codes will be exemplified. In the case of 8–9 NRZI codes, input information is divided into 8-bit blocks $X_i$. For example, assume that Xi is 01001110. A flag bit "0" or "1" is added to the beginning of each block to generate input data $Y_i$ as a 9-bit data block. In this case, the data $Y_i$ is 001001110 or 101001110. Furthermore, the data $Y_i$ is NRZI-converted into a recording data train $Z_i$. In this case, this data conversion is performed under an assumption that the bit at the end of the immediately preceding $Z_i$ is "0". $Z_i$ is 001110100 or 110001011.

As can be understood from this example, the recording data train $Z_i$ becomes bit-reversed patterns depending on the flag bit "0" or "1" and depending on this conversion result, DSV (Digital Sum Variation: a difference between the total number of data bits "0" and the total number of data bits "1" of the recording data train) of the NRZI-converted recording data bit train is calculated. The flag bit "0" or "1" is then determined, so that the DSV approaches 0. When input information is converted by this conversion rule, and the converted information is recorded, a conventional reproduction detection means can extract a reproduction clock from reproduction data itself since data bits "0" do not continuously appear in recording data. However, when the partial response is used, if input data includes continuous "1"s, since a recording data train also includes continuous "1"s, it is difficult to extract a reproduction clock from a reproduction signal for the above-mentioned reasons.

SUMMARY OF THE INVENTION

The present invention has been made in consideration of the above-mentioned problems, and has as its object to provide an information recording/reproduction apparatus and an information recording/reproduction method, which can extract a reproduction clock from a reproduction signal even when partial response waveform equalization is adopted.

According to the present invention, there is provided an information recording and/or reproduction apparatus comprising: conversion means for precoding a data train of 1 and 0 as recording information to convert the recording information into a recording data train; recording means for recording the recording data train on a recording medium; and reproduction means for obtaining a reproduction signal from the recorded recording medium by partial response waveform equalization, wherein the recording information has at least one data change from 0 to 1 or 1 to 0 within a predetermined period.

According to the present invention, there is also provided an information recording and/or reproduction apparatus for reading out a signal from an information recording medium by partial response equalization, and comparing the signal with N slice levels (N is an integer equal to or larger than 1) to generate a reproduction signal as N+i digital signals, comprising: DSP determination means for detecting a DC component of each of predetermined data blocks of input data, to which a flag bit is added, in units of data blocks; DSV determination means for detecting a DC component of the entire input data; and changing means for changing the flag bit in accordance with determination results from the DSP determination means and the DSV determination means, so that an output of the reproduction signal crosses at least one of the slice levels at least once within a predetermined period.

According to the present invention, there is also provided an information recording and/or reproduction method comprising: the step of precoding a data train of 1 and 0 as recording information to convert the recording information into a recording data train; the step of recording the recording data train on a recording medium; and the step of obtaining a reproduction signal by the recorded recording medium by partial response waveform equalization, wherein the recording information has at least one data change from 0 to 1 or 1 to 0 within a predetermined period.

According to the present invention, there is also provided an information recording and/or reproduction method for reading out a signal from an information recording medium by partial response equalization, and comparing the signal with N slice levels (N is an integer equal to or larger than 1) to generate a reproduction signal as N+i digital signals, comprising: the DSP determination step of detecting a DC component of each of predetermined data blocks of input data, to which a flag bit is added, in units of data blocks; the DSV determination step of detecting a DC component of the entire input data; and the step of changing the flag bit in accordance with determination results in the DSP determination step and the DSV determination step, so that an output of the reproduction signal crosses at least one of the slice levels at least once within a predetermined period.

Other methods and arrangements of the present invention will become apparent from the following discussion.

BRIEF DESCRIPTION OF THE DRAWINGS

FIG. 7 is a timing chart showing the operation of the embodiment shown in FIG. 5.

DETAILED DESCRIPTION OF THE PREFERRED EMBODIMENTS

Figure 1:
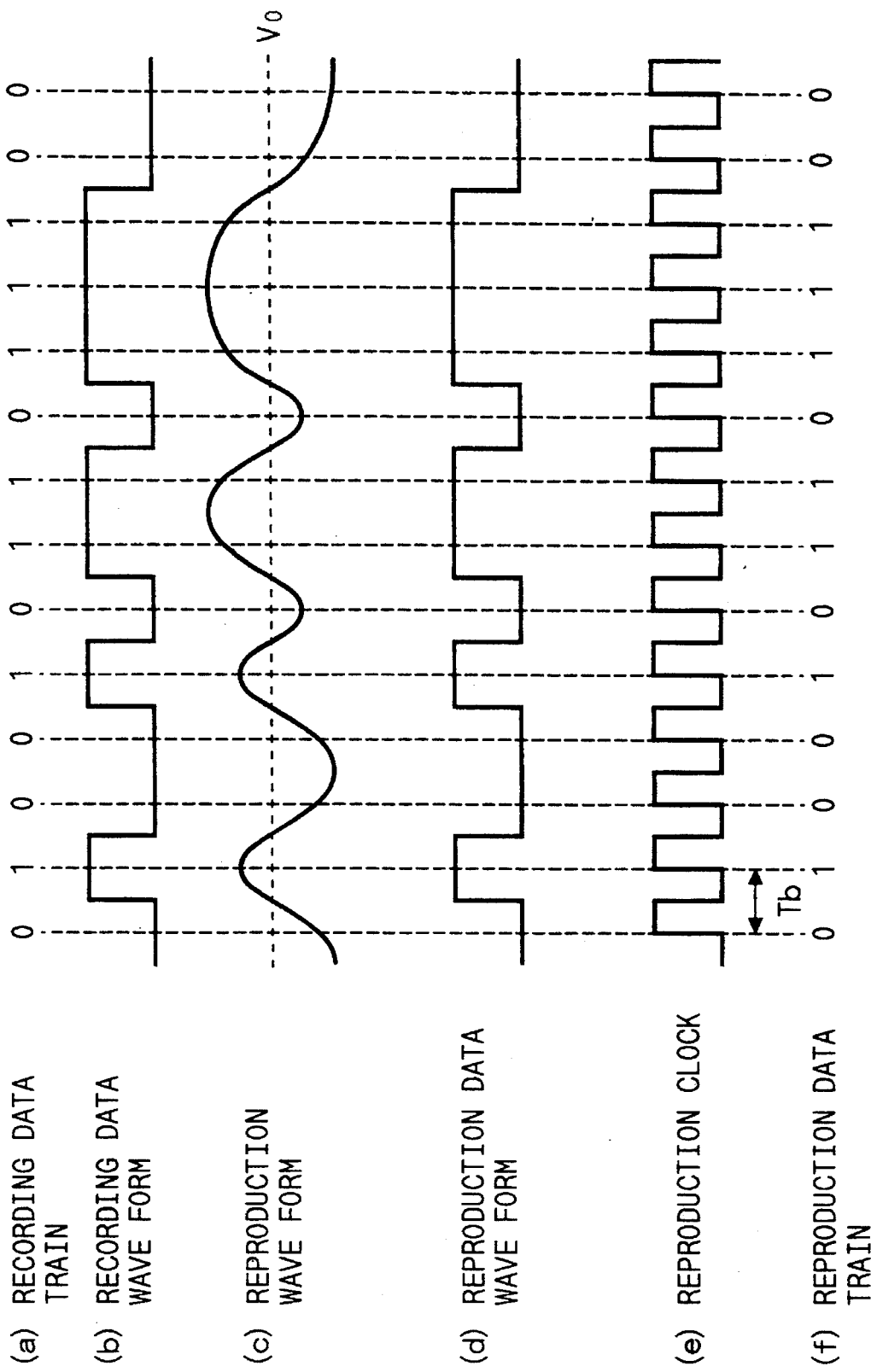
FIG. 1 is a chart for explaining recording and reproduction processes of a conventional information recording/ reproduction apparatus.
Figure 2:
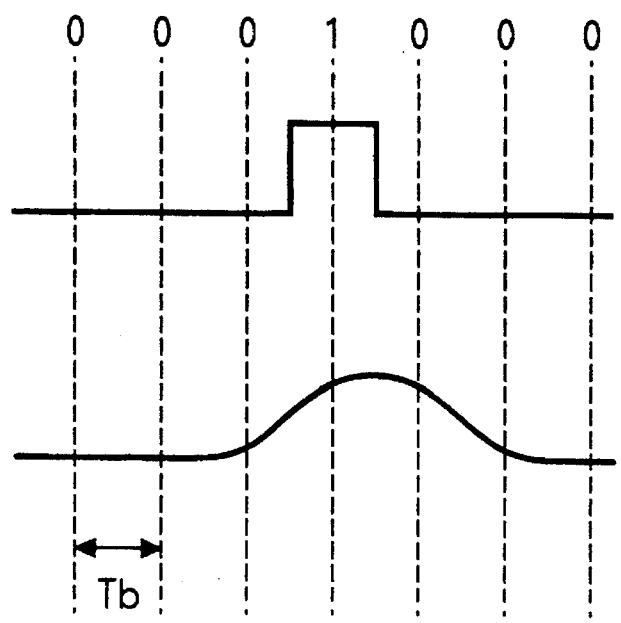
FIG. 2 is a chart for explaining the principle of partial response waveform equalization.
Figure 3:
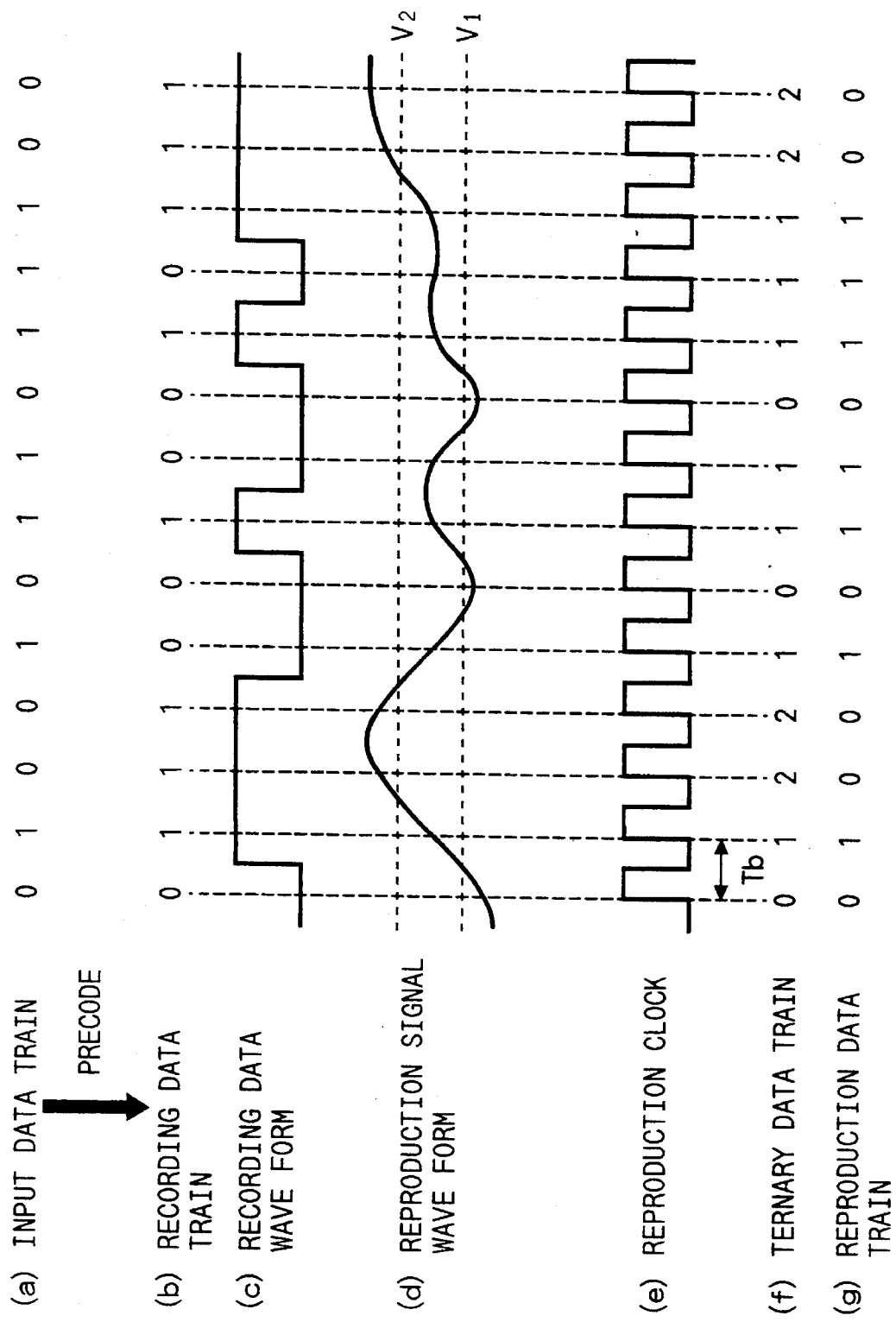
FIG. 3 is a chart for explaining recording and reproduction processes adopting the partial response waveform equalization.
Figure 4:
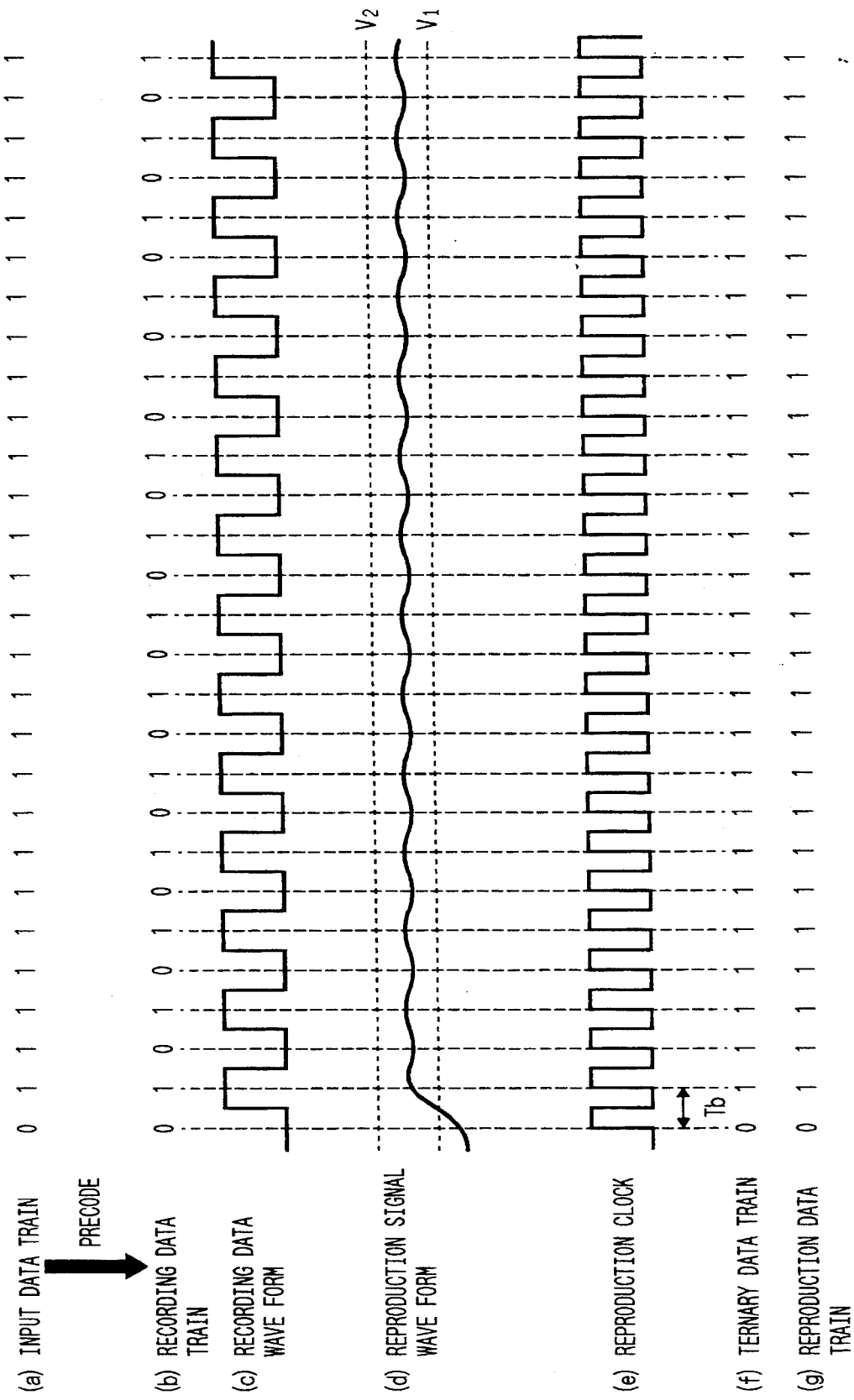
FIG. 4 is a chart showing signals in the recording and reproduction processes obtained when "1"s continuously appear in input information in the partial response waveform equalization.
Figure 5:
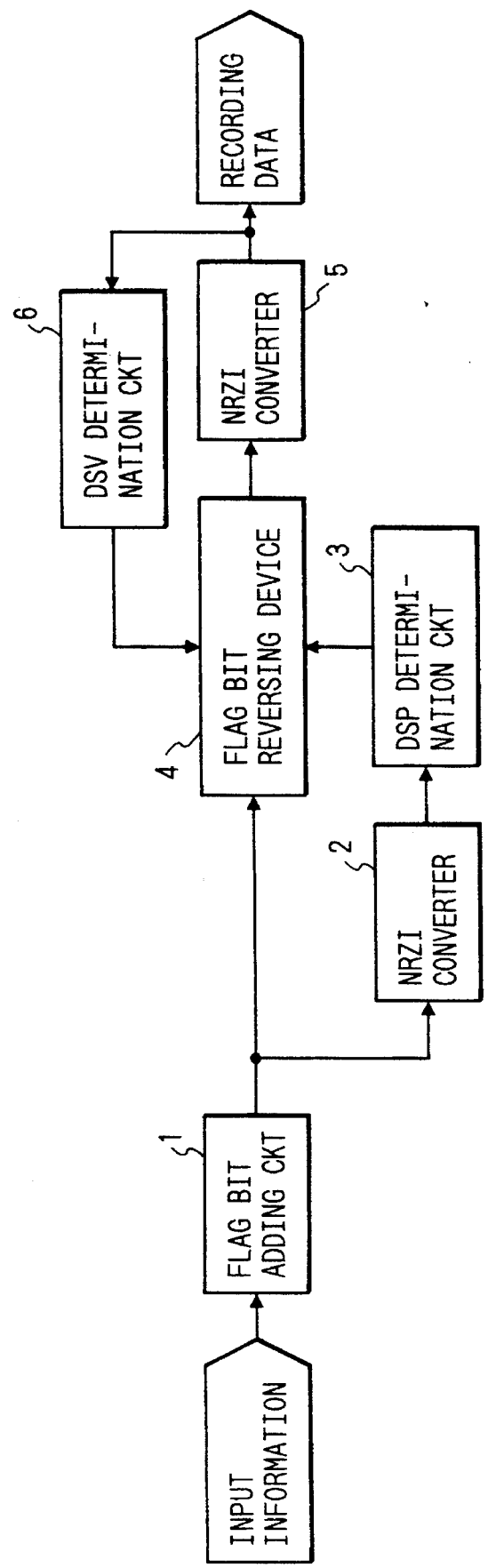
FIG. 5 is a block diagram showing an embodiment of an information recording/reproduction apparatus according to the present invention.

The preferred embodiments of the present invention will be described in detail hereinafter with reference to the accompanying drawings. FIG. 5 is a block diagram showing an embodiment of an information recording/reproduction apparatus of the present invention. FIG. 5 illustrates only an arrangement of a recording data modulation processing system as main part of the present invention. Note that this embodiment adopts 8–9 NRZI conversion as a code conversion method.

Referring to FIG. 5, a flag bit adding circuit 1 adds a flag bit to input information sent from an external apparatus. In this case, input information is input in units of 8-bit blocks, and a 1-bit flag bit is added to the beginning of data of each block by the flag bit adding circuit 1. The flag bit to be added is fixed to be "0" in this embodiment. An NRZI converter 2 NRZI-converts output data from the flag bit adding circuit 1. A DSP determination circuit 3 detects a DC component (DSP; Disparity) of codes for one block in units of 8-bit blocks. More specifically, the DSP determination circuit 3 determines a difference between the numbers of data "1" and "0" in units of block data. If the number of "1"s is larger than the number of "0"s, the circuit 3 determines positive; otherwise, the circuit 3 determines negative.

A flag bit reversing device 4 changes the flag bit added by the flag bit adding circuit 1 on the basis of determination results of the DSP determination circuit 3 and a DSV determination circuit 6 (to be described later). The arrangement of the bit reversing device 4 will be described in detail later. An NRZI converter 5 NRZI-converts output data from the flag bit reversing device 4 to generate recording data. The DSV determination circuit 6 detects a total DC component (DSV) of the recording data output from the NRZI converter 5. As described above, the DSV determination circuit 6 calculates a difference between the numbers of data bits "1" and "0" of a total recording data train. If the number of "1"s is larger than the number of "0"s, the circuit 6 determines positive; if the number of "0"s is larger than the number of "1"s, the circuit 6 determines negative; and if the number of "0"s is equal to the number of "1"s, the circuit 6 determines 0.

Figure 6:
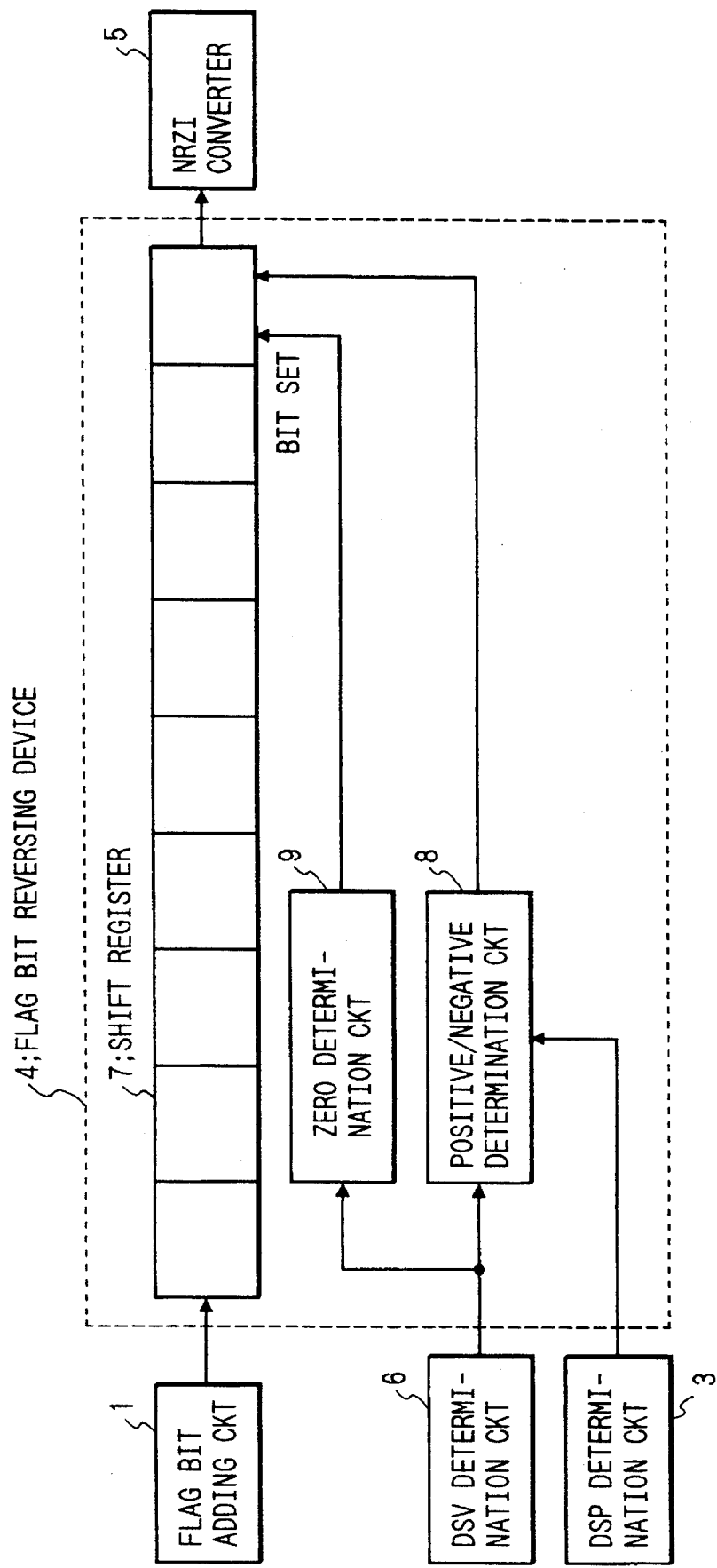
FIG. 6 is a block diagram showing the details of a flag bit reversing device shown in FIG. 5.

FIG. 6 is a block diagram showing the detailed circuit arrangement of the flag bit reversing device 4. The flag bit reversing device 4 comprises a 9-bit shift register 7, and a positive/negative determination circuit 8 for comparing the determination results from the DSP determination circuit 3 and the DSV determination circuit 6, and determining whether or not the two determination results coincide with each other, i.e., whether or not the two positive or negative determination results coincide with each other. The device 4 also comprises a 0 determination circuit 9 for detecting the determination result of 0 from the DSV determination circuit 6. More specifically, the DSV determination circuit 6 detects a difference between the numbers of data bits "1" and "0" of total data, and determines 0 if these numbers are equal to each other. The 0 determination circuit 9 also detects the DSV of 0.

The operation of this embodiment will be described below. Input information is sequentially transferred to the flag bit adding circuit 1, and a flag bit "0" is added to the beginning of each 8-bit block data. The data added with the flag bit by the flag bit adding circuit 1 is supplied to the flag bit reversing device 4, and is transferred to the 9-bit shift register 7 in units of block data (8-bit data + 1-bit flag bit). On the other hand, data output from the flag bit adding circuit 1 is also supplied to the NRZI converter 2. After the data is NRZI-converted by the NRZI converter 2, the converted data is supplied to the DSP determination circuit 3. The DSP determination circuit 3 performs DSP determination by detecting the difference between the numbers of data bits "1" and "0" in units of block data, and outputs the determination result to the positive/negative determination circuit 8 of the flag bit reversing device 4. The positive/negative determination circuit 8 also receives the determination result from the DSV determination circuit 6. More specifically, the output data from the flag bit reversing device 4 is converted by the NRZI converter 5, and the converted data is output as a recording data train. In this case, the DSV determination circuit 6 detects the DSV of total data, as described above, and outputs the determination result to the positive/negative determination circuit 8. The determination result from the DSV determination circuit 6 is also output to the 0 determination circuit 9 in the flag bit reversing device 4.

If the determination results from the DSP determination circuit 3 and the DSV determination circuit 6 coincide with each other, when the flag bit has been shifted to a flip-flop, corresponding to the end bit, of the shift register 7, the positive/negative determination circuit 8 in the flag bit reversing device 4 resets the flip-flop to change the flag bit to "1". On the other hand, if the determination results from the two determination circuits do not coincide with each other, the positive/negative determination circuit 8 does not perform a resetting operation of the flip-flop, and hence, data with the flag bit "0" is supplied to the NRZI converter 5. Furthermore, the 0 determination circuit 9 monitors the determination result from the DSV determination circuit 6. If the DSV from the DSV determination circuit 6 is 0, the 0 determination circuit 9 maintains the flag bit to be 0. More specifically, in this case, the 0 determination circuit 9 supplies data with the flag bit "0" to the NRZI converter 5 independently of a coincidence or non-coincidence of the determination results from the DSP determination circuit 3 and the DSV determination circuit 6. In this manner, the flag bit of input data is changed in units of blocks based on the determination results from the DSP determination circuit 3 and the DSV determination circuit 6. Thereafter, NRZI conversion is performed, and the converted data is supplied as a recording data train to the next demodulation processing circuit.

FIG. 7 shows signal waveforms of the respective units obtained when the above-mentioned flag bit changing processing is performed. FIG. 7 exemplifies a case wherein data bits "1" continuously appear in input information. (a) of FIG. 7 shows output data from the flag bit reversing device 4. As can be seen from (a) of FIG. 7, even when data bits "1" continuously appear, a bit "0" is inserted once per 18 bits since a flag bit is changed by the flag bit reversing device 4 based on the DSP and DSV determination results. Therefore, when this input data train is precoded, a recording data train shown in (b) of FIG. 7 is obtained, and furthermore, a recording data waveform shown in (c) of FIG. 7 is obtained. This recording data is recorded on an information recording medium (not shown). When the recorded data is reproduced, a reproduction signal shown in (d) of FIG. 7 can be obtained. As can be seen from (d) of FIG. 7, even when input information includes continuous bits "1" since a bit "0" is inserted once per 18 bits, the reproduction signal crosses a slice level $V_2$ once per 18 clocks. The obtained reproduction signal is compared with slice levels $V_1$ and $V_2$ to be converted into a ternary data train shown in (f) of FIG. 7. Furthermore, when this ternary data train is determined to be "1" in correspondence with level 1 and to be "0" in correspondence with level 0 or 2, a reproduction data train shown in (g) of FIG. 7 is generated.

In this manner, according to this embodiment, when bits "1" continuously appear in an information data train over a predetermined period, the flag bit is set to be "0" on the basis of the DSP and DSV determination results, so that a bit "0" is inserted in the information data train at least once within the predetermined period. Thus, a reproduction signal can cross one of N slice levels at least once within the predetermined period.

The above-mentioned embodiment exemplifies a case wherein bits "1" continuously appear in input information. However, when bits "0" continuously appear in input information, the flag bit is changed, so that a bit "1" is inserted at least once within the predetermined period. Therefore, in this case as well, a reproduction signal crosses the slice level at least once within the predetermined period.

As described above, according to the present invention, even when bits "1" or "0" continuously appear in input information, since a reproduction signal crosses the slice level at least once within the predetermined period, a reproduction clock can be extracted from the reproduction signal. Therefore, the present invention allows extraction of a reproduction clock when the partial response is adopted, which extraction is difficult to achieve in the conventional method. Therefore, data reproduction by the self-clock system can be satisfactorily performed.

The above embodiment exemplifies 8–9 NRZI codes. However, the present invention can be applied to other conversion rules such as 8–10 conversion.

It is important to precode input data so that a reproduction signal crosses a slice level at least once within a predetermined period.

What is claimed is:

1. An information recording and/or reproduction apparatus comprising:

detection means for detecting a reproduction signal read out from a recording medium as an (N+1)-value digital information signal (N is an integer equal to or larger than 2) by comparing the reproduction signal with N slice levels; and control means for executing control so that an output of the reproduction signal crosses at least one of the slice levels at least once within a predetermined period.

2. An apparatus according to claim 1, wherein said information recording and/or reproduction apparatus comprises a magnetooptical recording and/or reproduction apparatus adopting partial response.

3. An apparatus according to claim 2, further comprising:

means for adding a flag bit to an information data train consisting of a predetermined number of bits as a combination of 1 or 0;

code conversion means for NRZI-converting the information data train added with the flag bit into a recording data train; and means for recording the recording data train on a recording medium, wherein when bits "1" continue in the information data train over the predetermined period, the flag bit to be added is set to be 0, and when bits "0" continue in the information data train over the predetermined period, the flag bit to be added is set to be 1.

4. An information recording and/or reproduction apparatus comprising:

conversion means for precoding a data train of 1 and 0 as recording information to convert the recording information into a recording data train;

recording means for recording the recording data train on a recording medium; and reproduction means for obtaining a reproduction signal by the recorded recording medium by partial response waveform equalization, wherein the recording information has at least one data change from 0 to 1 or 1 to 0 within a predetermined period.

5. An information recording and/or reproduction apparatus for reading out a signal from an information recording medium by partial response equalization, and comparing the signal with N slice levels (N is an integer equal to or larger than 2) to generate a reproduction signal as N+1 digital signals, comprising:

DSP determination means for detecting a DC component of each of predetermined data blocks of input data, to which a flag bit is added, in units of data blocks;

DSV determination means for detecting a DC component of the entire input data; and changing means for changing the flag bit in accordance with determination results from said DSP determination means and said DSV determination means, so that an output of the reproduction signal crosses at least one of the slice levels at least once within a predetermined period.

6. An information recording and/or reproduction method comprising:

the step of precoding a data train of 1 and 0 as recording information to convert the recording information into a recording data train;

the step of recording the recording data train on a recording medium; and the step of obtaining a reproduction signal by the recorded recording medium by partial response waveform equalization, wherein the recording information has at least one data change from 0 to 1 or 1 to 0 within a predetermined period.

7. An information recording and/or reproduction method for reading out a signal from an information recording medium by partial response equalization, and comparing the signal with N slice levels (N is an integer equal to or larger than 2) to generate a reproduction signal as N+1 digital signals, comprising:

the DSP determination step of detecting a DC component of each of predetermined data blocks of input data, to which a flag bit is added, in units of data blocks;

the DSV determination step of detecting a DC component of the entire input data; and the step of changing the flag bit in accordance with determination results in the DSP determination step and the DSV determination step, so that an output of the reproduction signal crosses at least one of the slice levels at least once within a predetermined period.

8. An apparatus according to claim 1, wherein said information recording and/or reproduction apparatus uses partial response.

9. An information recording and/or reproduction apparatus comprising:

detection means for detecting a multi-value reproducing data train by reproducing from a recording medium on which a multi-value recording data train is recorded and comparing an output of a reproduction signal with a slice level; and recording means for recording the recording data train on the recording medium so that the output of the reproduction signal crosses said slice level within a predetermined period at least once.

10. An apparatus according to claim 9, wherein said information recording and/or reproduction apparatus uses partial response.

11. An information recording and/or reproduction apparatus comprising:

recording means for recording a recording data train of "1" and "0" on a recording medium;

detection means for detecting a reproduction data train of "1" and "0" by reproducing from the recording medium and comparing an output of a reproduction signal with a slice level, wherein the recording data train changes from "0" to "1", or from "1" to "0" within a predetermined period at least once.

12. An apparatus according co claim 11, wherein said information recording and/or reproduction apparatus uses partial response.

13. An information recording and/or reproduction apparatus comprising:

recording means for recording a recording data train of "1 and "0" on a recording medium; and detection means for detecting a reproduction data train of "1" and "0" by reproducing from the recording medium and comparing an output of a reproduction signal with a slice level, wherein the recording data train is so formed that "0" or "1" does not continue over a predetermined period.

14. An apparatus according to claim 13, wherein said information recording and/or reproduction apparatus uses partial response.

15. An information recording and/or reproducing method, comprising the steps of:

reproducing from a recording medium on which a multi-value recording data train is recorded, and comparing an output of a reproduction signal with a slice level so as to detect a multi-value reproduction data train; and recording the recording data train on the recording medium so that the output of the reproduction signal crosses said slice level within a predetermined period at least once.

16. A method according to claim 15, wherein said information recording and/or reproducing method uses partial response.

17. An information recording and/or reproducing method comprising the steps of:

recording a recording data train of "1" and "0" on a recording medium; and reproducing from the recording medium to compare an output of a reproduction signal with a slice level so as to detect a reproduction data train of "1" and "0", wherein the recording data train changes from "0" to "1", or from "1" to "0" within a predetermined period at least once.

18. A method according to claim 17, wherein said information recording and/or reproducing method uses partial response.

19. An information recording and/or reproducing method, comprising the steps of:

recording a recording data train of "1" and "0" on a recording medium; and reproducing from the recording medium to compare an output of a reproduction signal with a slice level so as to detect a reproduction data train of "1" and "0", wherein said information recording and/or reproducing method uses partial response.

* * * * *

UNITED STATES PATENT AND TRADEMARK OFFICE
CERTIFICATE OF CORRECTION

PATENT NO. : 5,548,284

DATED : August 20, 1996

INVENTOR(S) : MAKOTO HIRAMATSU

It is certified that error appears in the above-identified patent and that said Letters Patent is hereby corrected as shown below:

COLUMN 2

Line 48, "then" should read --then since--.
    Line 66, "Xi" should read --$X_i$--.

COLUMN 3

Line 9, " "1" " should read --"1",--.
    Line 41, "recorded" should be deleted.
    Line 50, "N + i" should read --N + 1--.

COLUMN 4

Line 1, "recorded" should be deleted.
    Line 10, "N + i" should read --N + 1--.

COLUMN 6

Line 39, " "1" " should read --"1",--.

UNITED STATES PATENT AND TRADEMARK OFFICE
CERTIFICATE OF CORRECTION

PATENT NO. : 5,548,284

DATED : August 20, 1996

INVENTOR(S) : MAKOTO HIRAMATSU

It is certified that error appears in the above-identified patent and that said Letters Patent is hereby corrected as shown below:

COLUMN 7

Line 51, "recorded" should be deleted.

COLUMN 8

Line 14, "recorded" should be deleted.
   Line 65, "co" should read --to--.

COLUMN 9

Line 3, " "1 " should read --"1"--.

Signed and Sealed this

Twenty-seventh Day of May, 1997

Attest:

BRUCE LEHMAN

Attesting Officer

Commissioner of Patents and Trademarks